United States Patent
Kondo et al.

(10) Patent No.: US 9,326,542 B2
(45) Date of Patent: May 3, 2016

(54) PROCESS FOR PRODUCING FOOD AND BEVERAGE PRODUCTS FROM MALT SPROUTS

(75) Inventors: Katsu Kondo, Kawasaki (JP); Koji Nagao, Yokohama (JP); Yoshiaki Yokoo, Fuchu (JP)

(73) Assignee: Suntory Holdings Limited, Osaka (JP)

( * ) Notice: Subject to any disclaimer, the term of this patent is extended or adjusted under 35 U.S.C. 154(b) by 502 days.

(21) Appl. No.: 10/552,525

(22) PCT Filed: Apr. 9, 2004

(86) PCT No.: PCT/JP2004/005116
§ 371 (c)(1),
(2), (4) Date: Oct. 11, 2005

(87) PCT Pub. No.: WO2004/091318
PCT Pub. Date: Oct. 28, 2004

(65) Prior Publication Data
US 2006/0263482 A1    Nov. 23, 2006

(30) Foreign Application Priority Data
Apr. 11, 2003   (JP) .................................. 2003-108267

(51) Int. Cl.
*C12C 11/00*   (2006.01)
*A23L 2/52*    (2006.01)
*A23L 1/185*   (2006.01)
*A23L 1/30*    (2006.01)
(Continued)

(52) U.S. Cl.
CPC . *A23L 2/52* (2013.01); *A23L 1/185* (2013.01); *A23L 1/3002* (2013.01)

(58) Field of Classification Search
CPC .......... A23L 1/185; A23L 2/52; A23L 1/3002
USPC ........... 426/592, 11, 425, 431, 436, 478, 479, 426/481, 518
See application file for complete search history.

(56) References Cited

U.S. PATENT DOCUMENTS 6,251,457 B1 *   6/2001   Takaichi et al. ................ 426/321

FOREIGN PATENT DOCUMENTS

| CS | 8603712 | * 12/1988 |
|---|---|---|
| GB | 1202124 | * 8/1970 |

(Continued)

OTHER PUBLICATIONS

Todorova, v, Kabakchieva, G., Ginova-Stoyanova, T. Obtaining and Applying Extracts of Malt Sprouts in the Production of Beer Wort, Khranitelna Promishlenost, 1988, 37 (4), pp. 17-18.*

(Continued)

*Primary Examiner* — Vera Stulii
(74) *Attorney, Agent, or Firm* — Ostrager Chong Flaherty & Broitman P.C.

(57) ABSTRACT

Technology for utilizing, as a raw material for food or beverage products, malt sprouts having been removed as the cause of odd taste, despite containing nitrogen sources and various active substances in high proportion, in the production of beer or whiskey is provided by a process for producing a food or beverage product wherein a malt sprout of controlled particle size are used as a raw material. In particular, a process for producing a food or beverage from malt sprouts wherein the ratio of particles of less than 150 μm size is 60 wt. % or less. This process for producing a food or beverage products preferably comprises the steps of immersing malt sprouts in a liquid so as to leach malt sprout components with the liquid and, after the leaching, removing the residual malt sprouts.

11 Claims, 2 Drawing Sheets

(56) References Cited

FOREIGN PATENT DOCUMENTS

| | | |
|---|---|---|
| JP | Hei 3-49662 | 3/1991 |
| JP | Hei 4-71466 | 3/1992 |
| JP | Hei 9-84540 | 3/1997 |

OTHER PUBLICATIONS

Fertman, G.I., Isakova E. A. Use of Malt Sprouts in the Yeast Production. Breadmaking and Confectionery Industry, No. 11, 1964, pp. 17-19.*

Fertman, G.I., Isakova E. A. Use of Malt Sprouts in the Yeast Production. Breadmaking and Confectionery Industry, No. 11, 1964, pp. 17-19 (English translation).*

Todorova, v, Kabakchieva, G., Ginova-Stoyanova, T. Obtaining and Applying Extracts of Malt Sprouts in the Production of Beer Wort, Khranitelna Promishlenost, 1988, 37 (4), pp. 17-18 (English translation).*

Beer Brewing Technology, 1999, 183, published by Shokuhin Sangyo Shimbun.

Encyclopedia of Fermented and Brewed Food Products,. 2002, 247, published by Asakura Shoten.

* cited by examiner

PROCESS FOR PRODUCING FOOD AND BEVERAGE PRODUCTS FROM MALT SPROUTS

The present application is an English language translation of International Application PCT No. PCT/JP2004/005116, filed Apr. 9, 2004, which claims priority to Japanese Application No. JP 2003-108267, filed Apr. 11, 2003; both applications are hereby incorporated by reference.

TECHNICAL FIELD

The present invention relates to a process for producing food and beverage products using malt sprouts. More specifically, the present invention relates to a process for producing food and beverage products using a malt sprout with controlled grain size.

BACKGROUND ART

Malt is used in the production of beer and whiskey and is made from barley in a process known as malting. The malting includes three major steps: (1) steeping; (2) germination; and (3) kilning (Encyclopedia of fermented and brewed food products (2002): 247, published by ASAKURA SHOTEN).

Once the dried malt (also known as "kilned malt") is obtained, the sprouts (rootlets) are removed from the malt using a deculmer. The sprouts are removed for the following reasons: (a) the sprouts tend to absorb moisture; (b) the bitter taste of the sprouts affects the aftertaste of beer; and (c) the sprouts, if used in beer production, adds color to beer (Beer brewing technology (1999): 183, published by SHOKUHIN SANGYO SHIMBUN). If left unremoved, the malt sprouts give the beer and other beverages an unpleasant flavor.

For this reason, the malt sprouts have been removed from the malt in the production of beer, whiskey and other malt products. The removed malt sprouts, a by-product produced in breweries, have generally been used as an animal feed (Beer brewing technology (1999): 183, published by SHOKUHIN SANGYO SHIMBUN).

Attempts have been made to use malt sprouts in food products. One example is food and beverage products containing water-soluble dietary fiber. These products contain partially decomposed products of hemicellulose obtained by extracting plant fiber materials, such as malt sprouts, with an alkali and enzymatically treating the extract (Japanese Patent Laid-Open Publication No. Hei 3-49662). A food product has also been proposed that comprises malt sprouts obtained by crushing and sieving malt sprouts containing husks, cobs and other by-products produced during malting of barley (Japanese Patent Laid-Open Publication No. Hei 9-84540).

Although being a rich source of soluble nitrogen and various active substances that can be utilized by yeast as nutrients, the malt sprouts have an unpleasant flavor and have been avoided in food and beverage products, especially when their production involves immersing materials in a liquid. Thus, a strong need has existed for a technique for producing food and beverage products that utilize malt sprouts, a rich source of nitrogen and active substances, yet have substantially no unpleasant flavor of malt sprouts.

As described, malt sprouts, despite being a rich source of nitrogen and various active substances, have been avoided in the production of beer and whiskey as a cause of unpleasant flavor, and it is thus an objective of the present invention to provide a technique that enables the use of malt sprouts as a material for making food and beverage products.

A particular objective of the present invention is to provide a technique that enables the use of malt sprouts in food and beverage products, the production of which involves immersing materials in a liquid.

DISCLOSURE OF THE INVENTION

The present inventors have put significant effort in achieving the aforementioned objectives and, as a result, have devised the present invention through the following course of investigation.

The present inventors first drew attention to the fact that malt sprouts, when used in beer production, add the beer an unpleasant flavor and in such cases, the malt sprouts are crushed with the other materials, including malt. Thus, the present inventors conducted a detailed examination of the correlation of the unpleasant flavor of the malt sprouts with the degree of crushing of the malt sprouts.

Specifically, malt sprouts were crushed at five different levels: strong, moderate, weak, slight and no crushing. Each of the five crushed products was immersed in a liquid and the resultant flavor of each liquid was evaluated. It was proven that the unpleasant flavor of malt sprouts decreased and, thus, the flavor of the immersion liquid improved as the degree of crushing was lessened. It was also shown that the unpleasant flavor of malt sprouts was dependent upon the amount of the soluble solid component in each immersion liquid: the five crushed products were individually immersed in a liquid and the amount of soluble solid component in each immersion liquid was determined. As a result, the solid content of the immersion liquid decreased, and so did the seeping out of contaminants from the solid components, as the degree of crushing was lessened.

The size effect of the crushed products of malt sprouts on the unpleasant flavor given by the malt sprouts was also examined: The results indicated that a crushed product with smaller particle size gave the immersion liquid more significant unpleasant flavor.

These observations suggest that by controlling the particle size (i.e., degree of crushing), malt sprouts can be used in the production of food and beverage products without giving the products the long-discussed unpleasant flavor. Based on this knowledge, the present inventors have completed the present invention.

Specifically, the present invention comprises the following aspects:

(1) A process for producing food and beverage products, using a malt sprout with controlled particle size;

(2) The process for producing food and beverage products according to (1) above, wherein the size-controlled malt sprout is either uncrushed malt or malt crushed at a low degree of crushing;

(3) The process for producing food and beverage products according to (1) or (2) above, comprising immersing the malt sprout in a liquid to allow the components of the malt sprout to seep out into the liquid;

(4) The process for producing food and beverage products according to (3) above, comprising, after the immersion step, removing the malt sprouts;

(5) The process for producing food and beverage products according to (3) or (4) above, wherein the particle size of the malt sprout is controlled to a degree at which the seeping out of the component of the malt sprout responsible for the unpleasant flavor is limited in the immersion step;

(6) The process for producing food and beverage products according to (1) to (5) above, wherein 60 wt % or less of the malt sprout particles used is smaller than 150 μm;

(7) The process for producing food and beverage products according to (1) to (5) above, wherein the malt sprout used has a specific surface area of 1.90 m²/g or less;

(8) The process for producing food and beverage products according to (1) to (5) above, wherein the malt sprout used has a bulk density of 0.37 or less;

(9) The process for producing food and beverage products according to (1) to (8) above, wherein the food and beverage product is a beverage product, a food product or an immersion liquid;

(10) The process for producing food and beverage products according to (9) above, wherein the beverage is an alcoholic beverage or a non-alcoholic beverage;

(11) The process for producing food and beverage products according to (10) above, wherein the alcoholic beverage is beer, happoshu (low-malt beer beverage), miscellaneous liquor, low-alcohol malt beverage, liqueur, whiskey or shochu;

(12) The process for producing food and beverage products according to (11) above, wherein the amount of the malt sprout used is 0.1 to 30 wt % with respect to the amount of the other materials of the beverage other than water and hop;

(13) The process for producing food and beverage products according to (12) above, wherein the beverage is beer, happoshu or low-alcohol malt beverage;

(14) The process for producing food and beverage products according to (10), wherein the non-alcoholic beverage is a soft drink, a tea beverage or a milk beverage; and

(15) A food and beverage product, obtained by the process according to (1) to (14) above.

BEST MODE FOR CARRYING OUT THE INVENTION

Figure 1:
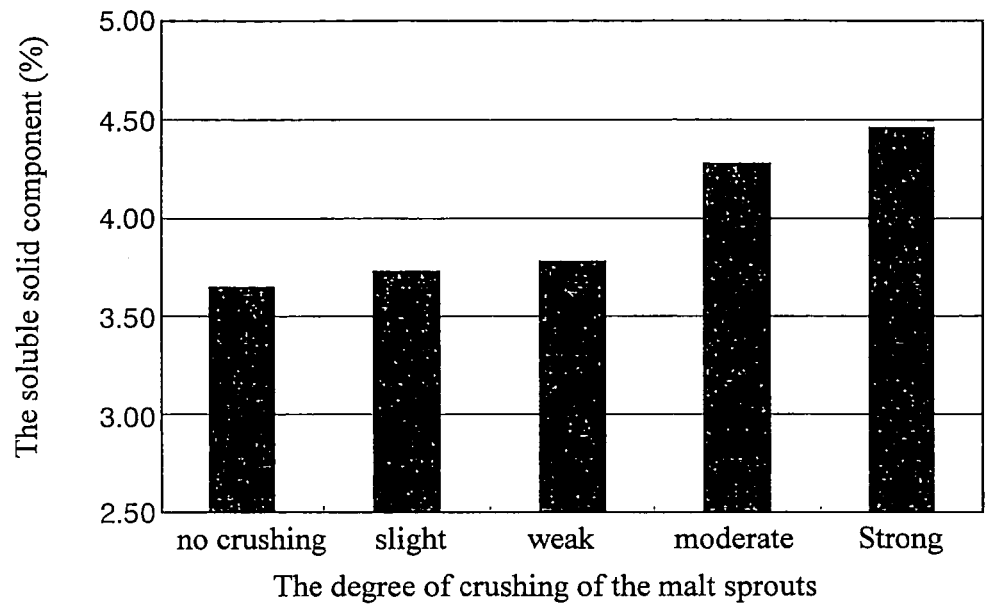
FIG. 1 is a diagram showing the results of Example 1.

The present invention will now be described in further detail.

As used herein, the term "malt sprouts" refers to rootlets that grow during the germination of barley. In general, several rootlets shoot out from a single grain of barley. As used herein, the term "barley" refers to a plant species known as Hordeum vulgare L. Barley belongs to the Poaceae family and is divided into six-, four-, or two-row barley based on the number of kernel rows. The same variety may be divided into winter barley and spring barley depending on the seeding season. The term "barley" as used herein encompasses newly bred barley varieties.

Malt sprouts are generally obtained from the process of malting, in which barley is processed into malt for use in the production of beer and whiskey (the process involves (1) steeping, (2) germination and (3) kilning). Specifically, the dried malt (or kilned malt) obtained in the kilning step (3) is passed through a deculmer to remove root lets. The resulting rootlet-rich fraction, or malt sprouts (which may contain husks), are a by-product produced in breweries and are generally used as animal feeds.

The term "malt sprouts" as used herein is not limited to those obtained as by-products produced in breweries: The malt sprouts with different rootlet lengths and thicknesses may be prepared by adjusting the growth factors of the malt sprouts (e.g., temperature for barley growth, the amount of water supply during germination, the ratio of oxygen to carbon dioxide present in the surface layer of the germination bed, and the length of the germination period). Undried malt with rootlets still attached to it, known as "green malt" or "raw malt," may also be used. The malt sprouts may be used without any processing, or they may be compressed with other ingredients into, for example, pellets. Dried malt that has rootlets still attached to it may also be used.

Shape is one of the most important features of the malt sprouts for use in the present invention. Specifically, the crushing of the malt sprouts for use in the present invention must be limited to a certain degree since the malt sprouts, if crushed further down, will give the unpleasant flavor to a liquid in which they are immersed. Thus, it is preferred that the malt sprouts for use in the present invention be used either uncrushed or crushed to a lesser degree.

The malt sprouts can be crushed to a lesser degree by using any of the following techniques: compression shearing (by means of, for example, stone mills, roll mills and ball mills), impact shearing (by means of, for example, hammers, pins and centrifuges), shearing (by means of, for example, roll mills and rotary blades), and impacting (by means of, for example, impactors).

Since it has been demonstrated that the proportion of relatively small particles in the crushed malt sprout affects the seeping out of the unpleasant flavor, it is preferred that 60 wt % or less of the crushed malt is composed of particles smaller than 150 μm.

Since malt sprouts have relatively large specific surface area if they contain a substantial proportion of small particles, the specific surface area can be used as an index of the particle size of the malt sprouts. The specific surface area can be determined by commonly used techniques, such as BET. Preferably, the malt sprouts for use in the present invention have a specific surface area of 1.90 m²/g or less.

The bulk density offers a simpler index of the degree of crushing of the malt sprouts than the sieve analysis. Thus, the degree of crushing of the malt sprouts for use in the present invention can be estimated by determining the bulk density of the malt sprouts. To determine the bulk density, the malt sprouts are screened through an 18.5-mesh sieve, are dropped into a 100 ml vessel, and are weighed according to the JIS standard for bulk density analysis. The bulk density is then determined by the following equation:

Bulk density (g/ml)=(Weight of the sample in the vessel (g))/(Volume of the vessel (ml)).

The results of the bulk density analysis demonstrate that the malt sprouts for use in the present invention are preferably crushed products with a bulk density of 0.37 g/ml or less.

Since the process for producing food and beverage products in accordance with the present invention allows the control of the seeping out of the unpleasant flavor from the malt sprouts into a liquid in which the malt sprouts are immersed, the process is particularly effective when applied to production processes of food and beverage products involving the steps of (1) immersing malt sprouts in a liquid, and (2) removing the malt sprouts from the liquid.

In the step of immersing malt sprouts in a liquid in the process of the present invention, the malt sprouts are immersed in a liquid such as extraction solvent and wort. In beer brewing, the above-described steps (1) and (2) are achieved by adding barley sprouts with controlled particles size after the crushing of the malt.

Alternatively, an immersion liquid obtained by immersing the malt sprouts in an immersion solvent may be added to food and beverage products. While the immersion solvent may be any solvent, it is preferably water or an organic solvent and, more preferably, an aqueous solvent in view of safety and availability. The pH, salt concentration and other factors of the immersion liquid may be adjusted as desired. The immersion solvent may be a supercritical fluid.

The temperature and the time of the immersion step can be determined depending on the type of the solvent and the extraction apparatus used.

The immersion step may be carried out by using any solid-liquid extraction technique when the immersion solvent is water or an organic solvent. Such an extraction technique may be a batch process, semi-batch process or continuous process and may utilize apparatuses operating by various extraction mechanisms.

After the immersion step, the immersion liquid is separated into a solid and a liquid phase by a common solid/liquid separator (e.g., mesh, strainer, cyclone, decanter, centrifuge and filter). The resulting clear solution is used as the immersion liquid of the present invention.

The immersion liquid may be further concentrated (by, for example, evaporation) for storage (by, for example, freezing or heat sterilization for short-term storage), or it may be dried to form a solid (for example, powder and granules). Each of these forms is encompassed by what is meant by the immersion liquid in the present invention. The immersion liquid may further be purified by subjecting various separation techniques based on the difference in speed (e.g., membrane separation and liquid chromatography), distribution equilibrium (liquid-liquid extraction and adsorption) and selective precipitation (precipitation and crystallization using organic solvents). The resulting concentrated solution is also encompassed by what is meant by the immersion liquid of the present invention. Thus, the food and beverage products containing these immersion liquids are also one aspect of the present invention.

In the present invention, it is essential to use malt sprouts in food and beverage products without adding unpleasant flavor of the malt sprouts. To this end, the malt sprouts may be added, rather than in the form of the immersion liquid obtained by immersing malt sprouts in water or other solvents, directly to a solvent along with the other materials to make food and beverage products, or the malt sprouts may be added to a solution that itself serves as a material of food and beverage products. Alternatively, the malt sprouts and the other materials may be individually immersed in respective liquids, and the liquids are then mixed together.

For example, the malt sprouts with controlled particle size can be added at any stage of the brewing process of beer and other fermented liquors in which the malt sprouts are immersed in a liquid to allow the components of the malt sprouts to seep out into the liquid. The malt sprouts can be added at any stage of the beer brewing process as long as the malt sprouts added will not be crushed any further and can be removed later from the system. Thus, the malt sprouts are preferably added during the preparation stages of the brewing process, such as mashing, wort separation, wort boiling and wort clarification. In this manner, the extracted malt sprouts can be removed during the filtration of the insoluble components of other materials. When the immersion liquid is used in the production of beer or other fermented liquors, the immersion liquid, already containing the seeped-out components of the malt sprouts, can be added at a wider range of stages, that is, at any stage during the preparation or fermentation of the beer brewing process.

While the amount of the malt sprouts in accordance with the present invention may be added in any amount, they are preferably added in such amounts that do not affect the flavor of the products, especially when the flavor is considered an important aspect of the products. For example, beer, liqueurs, soft drinks and other ready-to-drink beverages preferably contain 50 g/L or less of the malt sprouts (in final products). Specifically, 0.1 to 30 wt % of the malt sprouts are preferably used in beer, happoshu (low-malt beer beverage), or low-alcohol malt beverages with respect to the amount of the materials other than water and hops. The malt sprouts may be added in larger amounts when used in reducible beverages obtained by condensing or extracting the immersion liquids or solid products obtained by drying and solidifying the immersion liquids.

As used herein, the term "food and beverage product" refers to any food and beverage product to which the malt sprouts and/or the immersion liquid can be added, including alcoholic or non-alcoholic beverages. Examples of the alcoholic beverage include, but are not limited to, beer, happosyu, miscellaneous liquors, low-alcohol fermented malt beverages, liqueurs, whiskey and shochu. Examples of the non-alcoholic beverages include, but are not limited to, soft drinks (for example, soda, cola, nutritional drinks and other carbonated beverages, fruit juice-added beverages, coffee beverages and other noncarbonated beverages, mineral water and sports drinks), tea beverages (for example, green tea, oolong tea and tea) and milk beverages. Various health food products and functional food products are also examples of the food products intended by the present invention.

EXAMPLES

The present invention will now be described in further detail with reference to examples, which are not intended to limit the scope of the invention in any way.

Example 1

To find an effective method of using malt sprouts in making food and beverage products without adding the unpleasant flavor of the malt sprouts, malt sprouts were crushed to different degrees and were immersed in a liquid. The resulting immersion liquids were evaluated.

To prepare malt sprouts crushed to different degrees, domestically produced malt sprouts were used as a representative sample of malt sprouts marketed as a by-product produced in malting facilities. 3 kg of the malt sprouts were put in a plastic bag and were gently mixed until uniform. Using a shovel, the malt sprouts were divided into 5 bags in 700 g portions. Each bag was milled in a stone mill (Micropowder, Tokusyu Kika Kogyo Co., Ltd.) operated by compression shearing. Specifically, by turning the particle size adjuster dial, the lower millstone of the mill was vertically moved to adjust the clearance between the upper millstone and the lower millstone to five different levels. In this manner, the five bags were milled into five different types of malt sprouts with different degrees of crushing (i.e., strong, moderate, weak, slight and no crushing), each weighing 500 g or more (The size distribution of the five types is shown in Example 3). 100 g of each malt sprout were immersed in 1000 ml of 80° C. hot water and were left for 15 min to allow the components of the malt sprouts to seep out in water. Subsequent solid/liquid separation gave an immersion liquid.

The flavor of each immersion liquid was then evaluated (50 mL/subject). 10 trained tasters were each given the five immersion liquids and were asked to give each immersion liquid a score of 1 to 3 points according to the degree of the unpleasant flavor they felt: 1 point was given when the taster felt that the liquid had an unpleasant flavor; 2 points were given when the taster felt that the liquid had a slight unpleasant flavor; and 3 points were given when the taster felt that the liquid had little unpleasant flavor.

The results (averages of the flavor rating) were collectively shown in Table 1 below.

TABLE 1

| Degree of crushing malt sprouts | Flavor scores of immersion liquid (average) |
|---|---|
| Strongly crushed | 1.2 |
| Moderately crushed | 1.7 |
| Weakly crushed | 2.3 |
| Slightly crushed | 2.6 |
| Uncrushed | 2.8 |

As shown in Table 1, the unpleasant flavor decreased and, thus, the flavor rating improved as the degree of crushing was lessened. The overall average was 2.1 points. The rating was better than the average for the weakly crushed (2.3 pts), the slightly crushed (2.6 pts) or the uncrushed malt sprouts (2.8 pts).

Accordingly, it was demonstrated that the unpleasant flavor decreased and, thus, the flavor rating improved as the degree of crushing was lessened.

Furthermore, the soluble solid content in each immersion liquid was determined and the Brix (%) of each immersion liquid was determined. The results are as shown in FIG. 1: strong crushing=4.46%; moderate crushing=4.28%; weak crushing=3.78%; slight crushing=3.73%; and no crushing=3.65%.

The results indicate that the solid content of the immersion liquid decreased, and so did the seeping out of contaminants, as the degree of crushing was lessened.

Example 2

As in Example 1, a weakly crushed malt sprout was prepared and was subjected to the sieve analysis. The flavor of each of the resulting immersion liquids was evaluated. Specifically, a predetermined amount of the weakly crushed malt sprouts obtained in the same manner as in Example 1 was sieved through three differently sized sieves according to JIS Z8801 (60, 100, 140 traditional mesh) on a sieve agitator (Electric sieve ANF-30, Nitto Kagaku Co., Ltd. 2800 rpm, 15 min). The traditional mesh sizes of 60, 100 and 140 correspond to 250, 150 and 106 μm as measured in the standard mesh size, respectively. The sieving gave four fractions each having a different particle size (i.e., less than 106 μm, 106 to 150 μm, 150 to 250 μm and 250 μm or greater). 50 g of each fraction were immersed in 500 ml of 80° C. hot water and were left for 15 min to allow the components of the malt sprouts to seep out in water. Subsequent solid/liquid separation gave an immersion liquid. The flavor of each immersion liquid was evaluated.

The flavor was evaluated on a similar three-point scale to that used in Example 1. In a cup test, five trained tasters were given each of the four immersion liquids and were asked to give each immersion liquid a score of 1 to 3 points according to the degree of the unpleasant flavor they felt: 1 point was given when the taster felt that the liquid had an unpleasant flavor; 2 points were given when the taster felt that the liquid had a slight unpleasant flavor; and 3 points were given when the taster felt that the liquid had little unpleasant flavor. The tasters were also asked to give a score of 1 to 3 points according to the degree of coarse texture they felt on their tongues: 1 point was given when the taster felt that the liquid had coarse texture; 2 points were given when the taster felt that the liquid had a slightly coarse texture; and 3 points were given when the taster felt that the liquid had little coarse texture.

The results are shown in Table 2 below.

TABLE 2

| | Flavor scores (average) | |
|---|---|---|
| Malt sprout fractions | Unpleasant flavor | Coarse texture felt by the tongue |
| Less than 106 μm | 1.0 | 1.2 |
| 106-150 μm | 1.4 | 1.4 |
| 150-250 μm | 2.4 | 2.8 |
| 250 μm or greater | 2.8 | 3.0 |

As can be seen from the results of Table 2, the immersion liquid of the malt sprout fraction sized less than 106 μm had significant unpleasant flavor and coarse texture. The immersion liquid obtained by immersing the 106 to 150 μm fraction alone also had considerable unpleasant flavor and coarse texture.

In contrast, the immersion liquid obtained by immersing the 150 to 250 μm fraction alone had reduced unpleasant flavor and reduced coarse texture felt by the tongue. The immersion liquid obtained by immersing the 250 μm or larger fraction alone received the highest score, indicating the least unpleasant flavor and coarse texture felt by the tongue.

The average scores of the four fractions were 1.9 points for the unpleasant flavor and 2.1 points for the coarse texture felt by the tongue. The 150 to 250 μm fraction and the 250 μm or larger fraction scored higher than the average in terms of both the unpleasant flavor (2.4 points and 2.8 points, respectively) and the coarse texture felt by the tongue (2.8 points and 3.0 points, respectively).

These observations indicate that it is the 150 μm or smaller malt sprout fraction (the less-than-106 μm fraction and the 106 to 150 μm fraction combined) that is responsible for the unpleasant flavor of the food and beverage products.

Next, the specific surface area of the 150 to 250 μm fraction, which proved to have reduced unpleasant flavor and reduced coarse texture, was determined using the BET multiple-point method. Specifically, the fraction was shelf-dried for 6 hours at 70° C., and an approximately 2 g sample of the dried fraction was analyzed using a gas-adsorption/pore distribution analyzer VAS-300.

As a result, the fraction proved to have a specific surface area of 1.90 m$^2$/g. This, together with the fact that the fraction has reduced unpleasant flavor and reduced coarse texture, means that the malt sprout with a specific surface area of 1.90 m$^2$/g can be used to make an immersion liquid with less unpleasant flavor and coarse texture.

Example 3

The malt sprouts with five different degrees of crushing (i.e., strong, moderate, weak, slight and no crushing) used in Example 1 were subjected to the sieve analysis to determine the particle size distribution for the malt sprouts crushed to each degree of crushing. Specifically, 200 g of each of the malt sprouts crushed to each degree of crushing were sieved through three sieves having different mesh sizes according to JIS standards (i.e., 60, 100 and 140 traditional mesh) on the sieve agitator. This gave four fractions with different particle sizes (i.e., less than 106 μm, 106 to 150 μm, 150 to 250 μm and 250 μm or greater). The particle size distribution of each fraction was determined.

Figure 2:
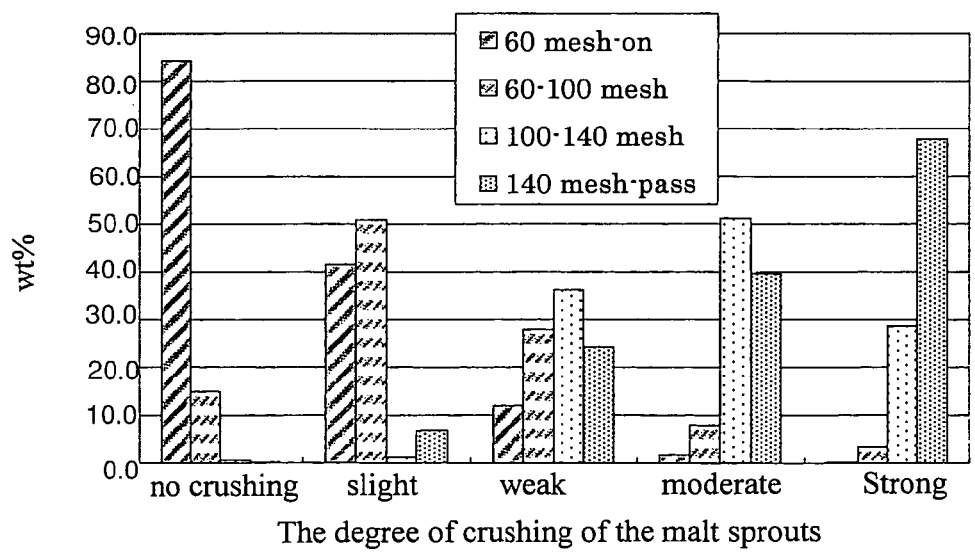
FIG. 2 is a diagram showing the results of Example 3.

The results are shown in FIG. 2.

As can be seen from FIG. 2, approximately 90% or more of the strongly and moderately crushed malt sprouts was composed of particles sized less than 150 μm (i.e., the less-than-106 μm fraction and the 106 to 150 μm fraction combined), which form the fraction responsible for the unpleasant flavor.

In contrast, a significant proportion of the weakly or slightly crushed malt sprouts was composed of the 150 to 250 μm fraction and the 250 μm or larger fraction. The particles smaller than 150 μm, which were responsible for the unpleasant flavor, accounted for 60.0 wt % of the weakly crushed malt sprouts (24.0 wt % of the less-than-106 μm fraction and 36.0 wt % of the 106 to 150 μm fraction), 7.9 wt % of the slightly crushed malt sprouts (6.7 wt % of the less-than-106 μm fraction and 1.2 wt % of the 106 to 150 μm fraction) and 0.8 wt % of the uncrushed malt sprouts (0.2 wt % of the less-than-106 μm fraction and 0.6 wt % of the 106 to 150 μm fraction).

The uncrushed malt sprouts contained a significant proportion of the 250 μm or larger fraction but little of the fractions responsible for the unpleasant flavor (i.e., the less-than-106 μm fraction and the 106 to 150 μm fraction).

These observations demonstrate that the malt sprouts when uncrushed or crushed to a lesser degree can be used to obtain an immersion liquid that has favorable flavor yet contains less contaminants.

It has also been proven that the malt sprouts are preferably used when uncrushed, slightly crushed or weakly crushed as demonstrated by the higher-than-the-average flavor ratings of Example 1. This, when considered with the results of the particle size distribution, implies that the malt sprouts are desired when containing 60 wt % or less of the particles smaller than 150 μm, which are responsible for the unpleasant flavor.

Example 4

A simpler technique for determining the particle size of the malt sprouts is to use, rather than the sieve analysis, the bulk density of the malt sprouts as an index of the particle size. In this example, the degree of crushing the malt sprouts that does not result in the unpleasant flavor was determined by using the bulk density.

The bulk density was determined for each of the five types of the malt sprouts obtained in Example 1 that were crushed to different degrees.

To determine the bulk density, the malt sprouts were screened through an 18.5-mesh sieve, were dropped into a 100 ml vessel, and were weighed according to the JIS standard for bulk density analysis. The bulk density was then determined by the following equation:

Bulk density (g/ml)=(Weight of the sample in the vessel (g))/(Volume of the vessel (ml)).

The results are shown in Table 3 below.

TABLE 3

| Degree of crushing | Bulk density (g/ml) |
| --- | --- |
| Strongly crushed | 0.42 |
| Moderately crushed | 0.38 |
| Weakly crushed | 0.37 |

TABLE 3-continued

| Degree of crushing | Bulk density (g/ml) |
| --- | --- |
| Slightly crushed | 0.35 |
| Uncrushed | 0.33 |

The bulk densities of the strongly crushed malt sprouts, the moderately crushed malt sprouts, the weakly crushed malt sprouts, the slightly crushed malt sprouts and the uncrushed malt sprouts were 0.42 g/ml, 0.38 g/ml, 0.37 g/ml, 0.35 g/ml and 0.33 g/ml, respectively: The bulk density decreased as the degree of crushing was lessened.

The results of the bulk density analysis demonstrate that the malt sprouts for use in the present invention are preferably uncrushed, slightly crushed or weakly crushed products with a bulk density of 0.37 g/ml or less Example 5

Next, the active ingredients present in the malt sprouts were examined. As already demonstrated, the uncrushed malt sprouts can be immersed in a liquid so that the active ingredients present in the malt sprouts can seep out in the liquid without adding the unpleasant flavor of the malt sprouts to the liquid. In this example, the uncrushed malt sprouts were immersed in water to serve as the immersion solvent so as to determine the presence of muscarinic M3 receptor agonists. The study revealed the presence of a muscarinic M3 receptor agonist as one of the active ingredients in the malt sprouts that are potential stimulators of gastrointestinal motility.

The test for the binding activity to muscarinic M3 receptors was conducted in the following manner.

A specimen (a freeze-dried product of a malt sprout immersion liquid) and 0.2 nM [$^3$H]4-diphenylacetoxy-N-methylpiperidine methiodide ([$^3$H]4-DAMP) to serve as a ligand were added to a suspension of a cell membrane preparation obtained from a transfected Chinese hamster ovary (CHO) cell line expressing human muscarinic M3 receptors. The mixture was then incubated at 22° C. for 60 min. Subsequently, the reaction mixture was aspirated and filtered through a glass fiber filter (GF/B, Perkin Elmer) to terminate the reaction. The mixture was then washed several times with ice-chilled buffer. A scintillation cocktail (Microscint-0, Perkin Elmer) was then added to the filter, and the residual radioactivity was measured by a liquid scintillation counter (TopCount, Perkin Elmer). The amount of specific binding of [$^3$H]4-DAMP was determined by subtracting the amount of non-specific binding in the presence of 1 μM atropine from the amount of total binding of [$^3$H]4-DAMP.

The binding activity to muscarinic M3 receptors of each specimen (freeze-dried product of the malt sprout immersion liquid) was determined by the following equation:

Activity=100(%)−specific binding (%) of [$^3$H]4-DAMP where the specific binding (%) of [$^3$H]4-DAMP was obtained by using a predetermined dose of each specimen (equivalent to 0.86 mg/ml of malt sprouts).

100 g portions of the uncrushed malt sprouts were placed in four separate sealed glass containers. To each container, 100 mL water having a predetermined temperature (5, 40, 60 or 80° C.) was added to immerse the malt sprouts and the containers were each placed in an incubator at each temperature. 50 ml samples were taken every 3 min for 15 min. The collected samples of each immersion liquid were immediately subjected to solid/liquid separation and were evaluated. Following the sampling at 15 min, each immersion liquid was maintained at each temperature and another sample was taken after a 150 min immersion period and was evaluated in the same manner.

Figure 3:
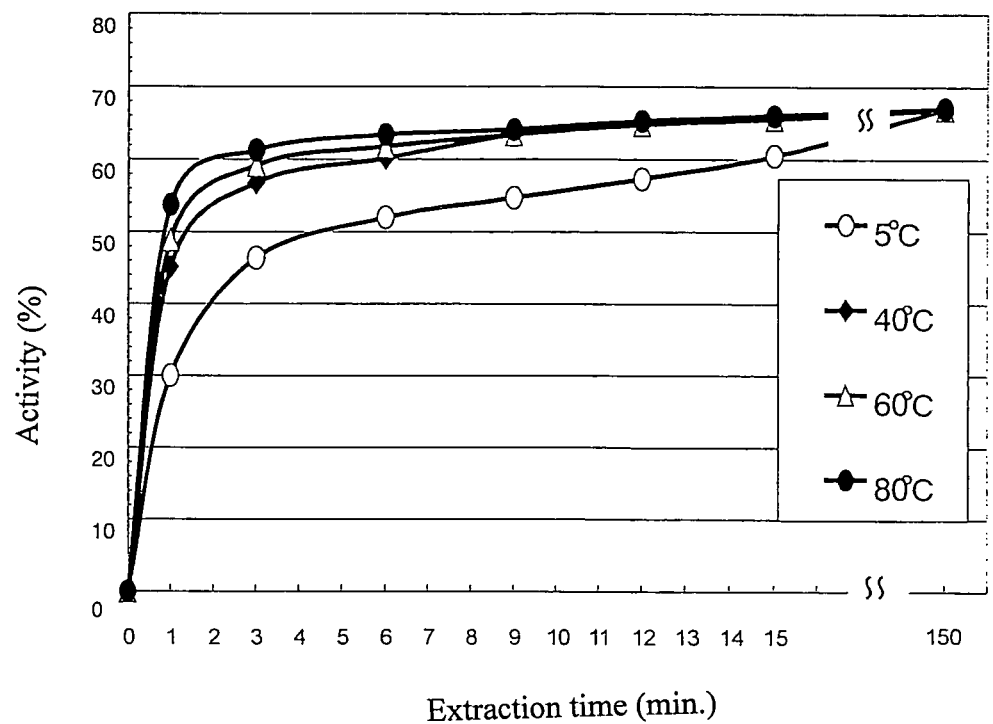
FIG. 3 is a diagram showing the results of Example 5.

The results are shown in FIG. 3. These results indicate that the muscarinic M3 receptor agonist seeped out from the uncrushed malt sprouts in a relatively short period of time (in several minutes) at each temperature, although the seeping out was relatively slow at temperature of 5° C. This suggests that the uncrushed malt sprouts can be used to obtain useful immersion liquids that contain physiologically active substances and yet have reduced unpleasant flavor.

In conclusion, the present invention offers a useful technique for utilizing, in food and beverage products, muscarinic M3 receptor agonists and other physiologically active substances present in the malt sprouts without adding the unpleasant flavor of malt sprouts. The immersion solvent may be used in a wide range of temperature.

Example 6

An alcoholic beverage (sparkling low malt beverage, or "happoshu") was produced as an example of the beverages using the malt sprouts of the present invention. Malt, hop, uncrushed malt sprouts (the uncrushed malt sprouts used in Example 1) and water were used. 200 L starting material was prepared and was fermented, filtrated and then filled in containers according to the common brewing process. Specifically, 20 kg of crushed malt were mashed in a mash tun. 1 kg of the uncrushed malt sprouts was then added as a sub material and the resulting material was filtered in a filtration tank. Subsequently, hops and liquid sugar were added and the resulting material was boiled in a boiling vessel. The resultant sediment including proteins was removed in a whirl pool. To the resulting clear solution, yeast was added and the solution was fermented and stored at −1° C. Subsequently, the fermented solution was filtered to remove yeast. This gave a fermented liquor with approximately 4% alcohol content (assigned as trial product 3. The product contained 5 g/L of the malt sprouts of the present invention). Also prepared were a similar happoshu product (control product 3-1) using the moderately crushed malt sprouts (the moderately crushed malt sprouts used in Example 1) and the malt sprout-free happoshu product (control product 3-2).

Ten trained tasters were given each of the trial product 3 and the control products 3-1 and 3-2 and were asked to give each product a score of 1 to 3 points according to the flavor they felt: 3 points were given when the taster felt the product was tasty; 2 points were given when the taster felt the product was acceptable; and 1 point was given when the taster felt the product did not taste good. On average, the trial product 3 received 2.7 points, the control product 3-1 received 1.8 points, and the control product 3-2 received 2.5 points. Overall, the trial product 3 was rated as tastier than the control product 3-1 and as tasty as the control product 3-2.

Next, the trial product 3 and the control product 3-2 were examined for the content of soluble nitrogen and free amino nitrogen (as measured by the amount of glycine) present in the solutions prior to addition of yeast. The trial product with the uncrushed malt sprouts added to it contained 72.3 mg/100 ml of soluble nitrogen and 16.4 mg/ml of free amino nitrogen. The malt sprout-free product contained 45.7 mg/100 ml of soluble nitrogen and 10.2 mg/ml of free amino nitrogen. These results indicate that the beverages containing the malt sprouts of the present invention can contain increased amounts of soluble nitrogen and free amino nitrogen, which provide the nutrition required for the growth of yeast.

Although the malt sprouts have been used as an additive to growth medium, no techniques have been available for making use of the malt sprouts as an additive to the growth medium for yeast fermentation without affecting the favorable flavors of the food and beverage products to which the malt sprouts are added. The malt sprouts of the present invention achieve such a technique and enable effective use of malt sprouts.

Example 7

An alcoholic beverage (liqueur) was prepared as an example of the food and beverage products using the immersion liquid of the present invention. 100 g of malt sprouts of the present invention (the uncrushed malt sprouts used in Example 1) were immersed in pure water (1000 ml), the immersion solvent, at 60° C. for 15 min. Subsequent solid/liquid separation gave an immersion liquid (Brix=3%, approx. 700 ml).

1190 mL 59% alcohol, 100 mL clear grapefruit juice (concentrated five-fold), 250 g sugar, 15 g citric acid, 5 mL flavor and the whole amount of the immersion liquid were added together. To this mixture, pure water was added to a final volume of 10 L. This solution was heat-sterilized, was cooled, was carbonated and was filled in a 250 ml can, which was then sealed to make a grapefruit-flavored canned alcoholic beverage with 7% alcohol content (liqueur). This was designated as trial product 7 (containing 10 g/L of the malt sprouts of the present invention). A similar but immersion liquid-free alcoholic beverage was also prepared and was designated as control product 7.

Five trained tasters were given each of the trial product 7 and the control product 7 and were asked to give each product a score of 1 to 3 points according to the flavor they felt: 3 points were given when the taster felt the product was tasty; 2 points were given when the taster felt the product was acceptable; and 1 point was given when the taster felt the product did not taste good. Each beverage received 2.8 points on average. This indicates that the beverage of the present invention, though using malt sprouts, does not have the unpleasant flavor of the malt sprouts.

Example 8

A nonalcoholic beverage (soft drink) was prepared as an example of the beverage products using the malt sprout of the present invention (the slightly crushed malt sprouts used in Example 1). 40 g granulated sugar was dissolved in 50° C. pure water. To this solution, a concentrated turbid juice (orange juice (concentrated 5-fold) or apple juice (concentrated 4-fold)) was added so that the solution contains 1% juice (as measured by the amount of straight juice). To the resulting mixture, 0.15 g citric acid, an immersion liquid in an amount equivalent to 50 g malt sprouts (as in Example 7), 2 mL flavor and 0.25 g L-ascorbic acid were added, followed by addition of pure water to a final volume of 1000 mL. This solution was heat-sterilized at 100° C. for 20 min. 100 ml of the solution was then filled in a 110 mL clear bottle, which was sealed to make a fruit juice-based near-water beverage (containing 1% fruit juice and 50 g/L malt sprouts of the present invention).

Example 9

Approximately 1.5 kg of the malt sprouts of the present invention (the weakly crushed malt sprouts used in Example 1) were immersed in 15 L pure water to obtain an immersion liquid. The immersion liquid was concentrated by evaporation and was then freeze-dried to give approximately 300 g of a dried extract of the immersion liquid (approx. 20% yield (w/w)). 1000 mg dried extract, 200 mg lactose and 300 mg crystalline cellulose were mixed together and the mixture was formed into a tablet-shaped health food product, each containing 1500 mg ingredients.

INDUSTRIAL APPLICABILITY

As set forth, the present invention allows the use of malt sprouts, a rich source of nitrogen and active substances previously avoided in the production of beer and whiskey due to its unpleasant flavor, in the production of food and beverage products. The malt sprouts of the present invention are suitable for use in food and beverage products especially when their production process involves immersing the materials in a liquid. The food and beverage products using the malt sprouts have a flavor and taste comparable to their malt sprout-free counterparts.

The food and beverage products provided by the present invention enable effective use of nitrogen and active substances present in malt sprouts and are highly nutritious. The present invention, thus, is of significant importance.

The invention claimed is:

1. A process for producing food and/or beverage products using malt sprouts consisting of:
   a) obtaining a collection of malt sprouts of controlled particle size from about 150 µm to about 250 µm;
   b) immersing the collection of malt sprouts in a liquid for a period of time to allow components of the malt sprouts to seep into the liquid thereby producing an immersion liquid; and
   c) using the immersion liquid as an ingredient to produce the food and/or beverage product.

2. A process for producing food and/or beverage products using malt sprouts comprising:
   a) fractionating crushed malt sprouts into four fractions of controlled particle size, wherein the four fractions are less than 106 µm, 106 to 150 µm, 150 to 250 µm and 250 µm or greater;
   b) obtaining a collection of crushed malt sprouts from the fractions of step (a)
   having a bulk density of 0.35 g/ml or greater and wherein a 7.9% or less of the sprouts is composed of the combined 106 to 150 µm and less than 106 µm fractions;
   c) immersing the collection of malt sprouts in a liquid for a period of time to allow components of the malt sprouts to seep into the liquid thereby producing an immersion liquid; and
   d) using the immersion liquid as an ingredient to produce the food and/or beverage product.

3. A process for producing food and/or beverage products using malt sprouts comprising:
   a) fractionating crushed malt sprouts into four fractions of controlled particle size, wherein the four fractions are less than 106 µm, 106 to 150 µm, 150 to 250 µm and 250 µm or greater;
   b) obtaining a collection of crushed malt sprouts from the fractions of step (a)
   having a bulk density of 0.37 g/ml or greater and wherein 60 wt % or less of the sprouts is composed of the combined 106 to 150 µm and the less than 106 µm fractions;
   c) immersing the collection of malt sprouts in a liquid for a period of time to allow components of the malt sprouts to seep into the liquid thereby producing an immersion liquid; and
   d) using the immersion liquid as an ingredient to produce the food and/or beverage product.

4. The process for producing food and beverage products according to any one of claims 1 and 2, comprising the step of removing the malt sprouts after the immersion step.

5. The process for producing food and beverage products according to any one of claims 1 and 2, wherein the malt sprouts used have a specific surface area of 1.90 m$^2$/g or less.

6. The process for producing food and beverage products according to any one of claims 5, 1, and 2 wherein the food and beverage product is a beverage product, a food product or an immersion liquid.

7. The process for producing food and beverage products according to claim 6, wherein the beverage product is an alcoholic beverage or a non-alcoholic beverage.

8. The process for producing food and beverage products according to claim 7, wherein the alcoholic beverage is beer, happoshu (low-malt beer beverage), liquor, low-alcohol malt beverage, liqueur, whiskey or shochu.

9. The process for producing food and beverage products according to claim 8, wherein the amount of the malt sprouts used is 0.1 to 30 wt % with respect to the amount of the other materials of the beverage other than water and hop.

10. The process for producing food and beverage products according to claim 9, wherein the alcoholic beverage is beer, happoshu or low-alcohol malt beverage.

11. The process for producing food and beverage products according to claim 7, wherein the non-alcoholic beverage is a soft drink, a tea beverage or a milk beverage.

* * * * *